Oct. 11, 1949. C. M. SAVRDA 2,484,426
RIBBING KNIFE
Filed May 10, 1944 3 Sheets-Sheet 1
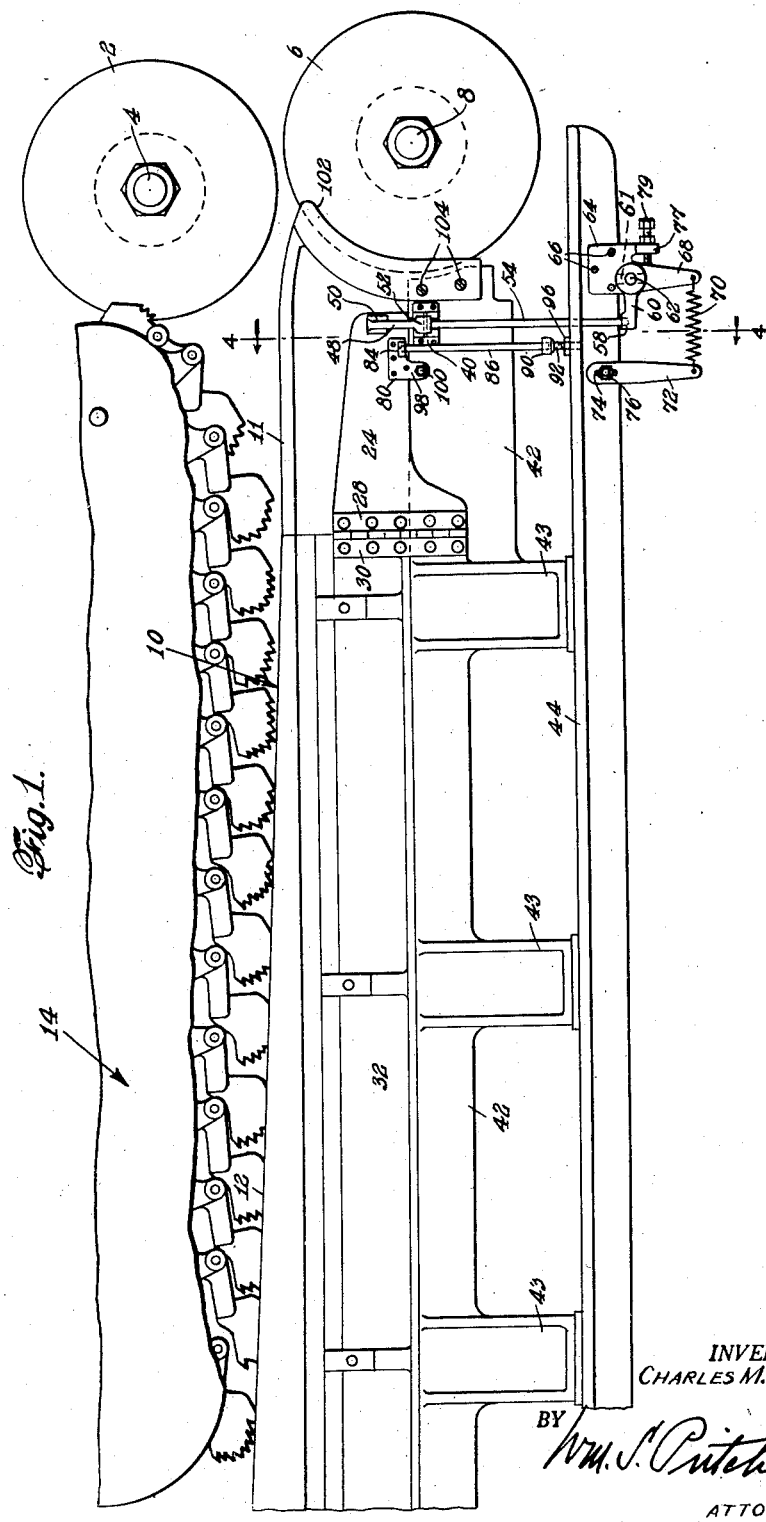
INVENTOR.
Charles M. Savrda
BY
Wm. S. Pritchard
ATTORNEY

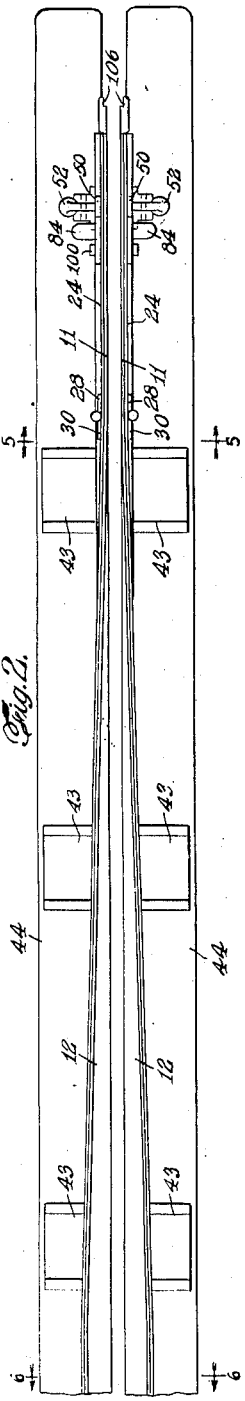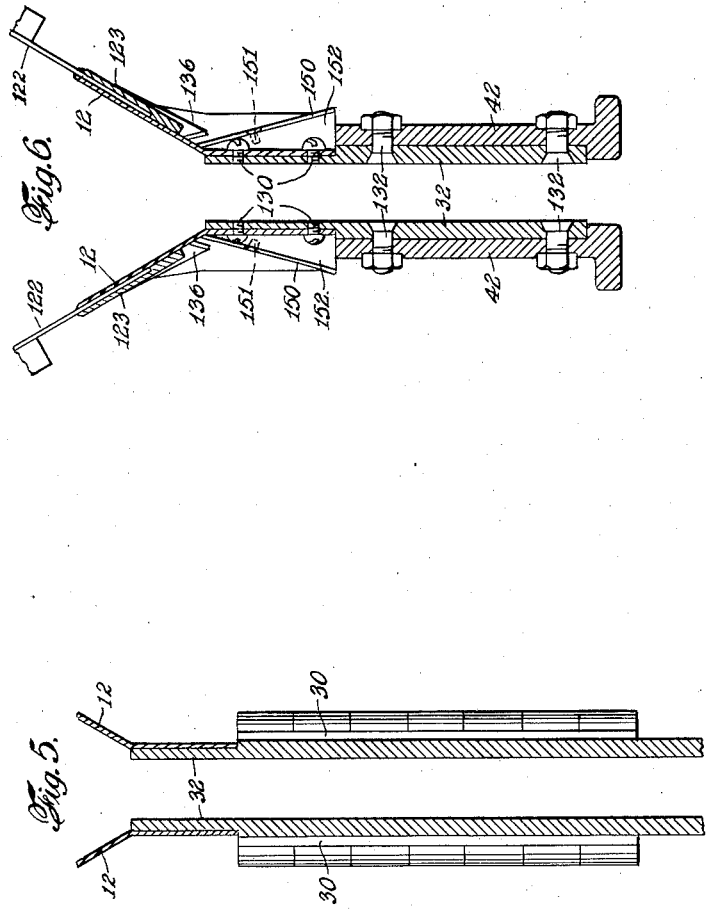

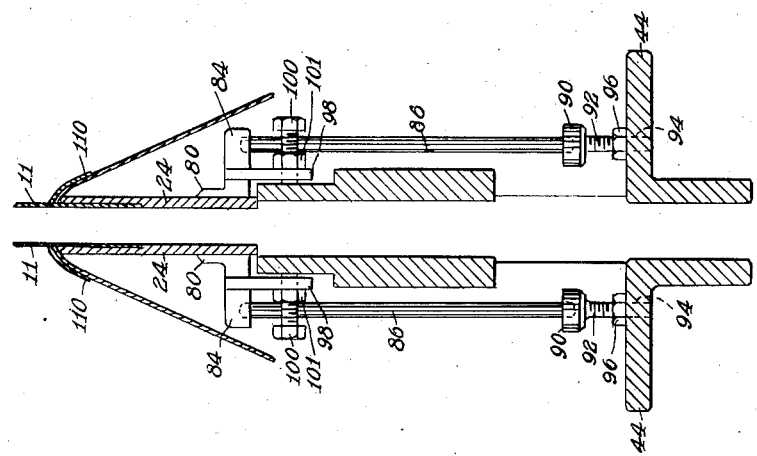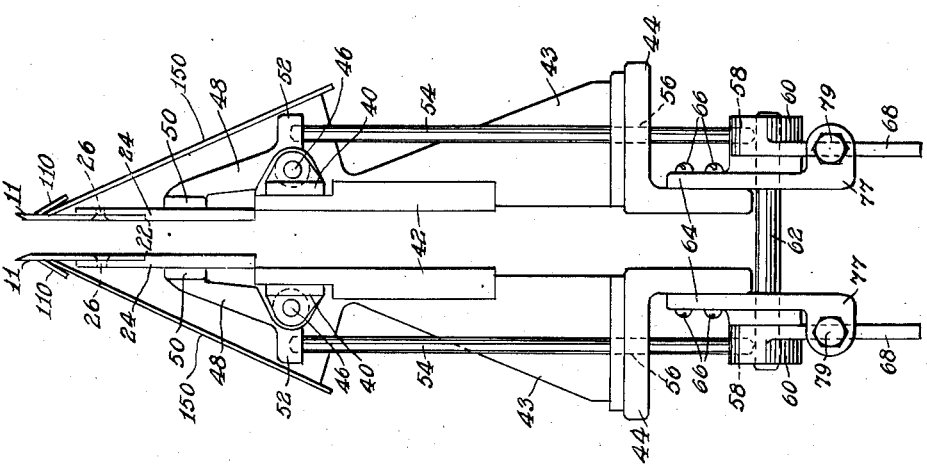

Patented Oct. 11, 1949

2,484,426

UNITED STATES PATENT OFFICE 2,484,426

RIBBING KNIFE

Charles M. Savrda, Bay Shore, N. Y., assignor, by mesne assignments, to Fish Machinery Corporation, Boston, Mass., a corporation of Delaware Application May 10, 1944, Serial No. 534,875

11 Claims. (Cl. 17—4)

This invention relates to fish filleting machines, and more particularly to ribbing knives to scrape the fillets from the ribs.

United States Patent 2,149,021 discloses a fish filleting machine wherein a fish, tail leading and back downward, is first cut inwardly from its back throughout its length and almost to the backbone, and thereafter passed through the sphere of action of a pair of circular belly-cutting knives which slit the belly. During the belly-slitting operation, the fish is supported upon a pair of rotating guide discs. The guide discs and the circular belly-slitting knives are rotated at high peripheral speeds. When the fish leaves the zone of action of the belly-slitting knives, each fillet remains attached to the ribs of the fish and also to the backbone of the fish between the cuts from the back and belly. Due to the rotation of the belly-slitting knives and the supporting guide discs, the fish is projected onto a pair of rigid ribbing knives which sever the fillets from the backbone and the ribs. A ribbing conveyer serves to maintain the fish in contact with the ribbing knives and feed the fish thereover.

The apparatus above described functions satisfactorily. However, since the fish is projected with great force from the sphere of action of the belly-slitting knives onto the ribbing knives, the first four or five leading ribs on first contacting the ribbing knives may sometimes be severed or broken, with the result that a boneless fillet will not be obtained.

An object of this invention is to provide new and improved ribbing knives.

Another object of this invention is to provide ribbing knives which will not break or sever the leading ribs of a fish projected thereon.

An additional object of this invention is to provide ribbing knives capable of use with fish of different sizes with a minimum loss of flesh.

A further object of this invention is to provide a pair of ribbing knives with oppositely disposed yieldable sections which are simultaneously actuated by a fish of a size larger than that for which said sections are initially set to accommodate, so that the ribbing knives will sever the flesh adhering to the backbone with a minimum loss of flesh.

Other and additional objects will appear hereafter.

Certain of the objects are, in general, accomplished by blunting the front ends of the ribbing knives whereby, as each portion of a fish is projected thereon from the zone of action of the belly-slitting knives, the force of projection will be cushioned and the blunt edge will not sever or break the leading ribs. The other objects are accomplished by providing each of the ribbing knives with a section at the forward end thereof, each section being pivotally mounted at the rear thereof whereby the front end can be moved laterally outwardly to accommodate fish of larger size than that for which the ribbing knives are originally set and sever the flesh adhering to the backbone with a minimum loss of flesh. The hinged section of each knife is provided with means to equalize the expanding and contracting movement of each hinged section. Means also are provided to support the free end of the hinged section and prevent any strain imposed on the movable knife holder by the oncoming fish from being placed on the hinges.

The invention is particularly adapted for use in combination with an apparatus in which, as the decapitated fish is led tail leading and back downward, the back thereof is slit throughout its length almost up to the backbone and later the belly side is cut by a pair of parallel incisions. Such an illustrative apparatus, which is shown in United States Patent 2,149,021, is also provided with various means for positioning the fish, feeding the fish, straightening the fins, etc. and may be provided with a dorsal fin-removing device such as, for example, that shown in United States Patent 2,137,291 or 2,406,907.

The details of the invention will now be explained in connection with the accompanying drawings, wherein:

Figure 1 is a side elevation of an embodiment of the instant invention;

Figure 2 is a top plan view of the ribbing knives;

Figure 3 is an end view of the ribbing knives with the belly knives and traction discs omitted;

Figure 4 is a section taken on the line 4—4 of Figure 1;

Figure 5 is a section taken on the line 5—5 of Figure 2; and

Figure 6 is a section taken on the line 6—6 of Figure 2.

Referring now to the drawings wherein like reference numerals designate like parts, the reference numeral 2 designates a pair of parallel circular belly-slitting knives mounted on a single shaft 4 carried in a suitable bearing mounted on the frame of the machine (not shown). Below the belly knives 2, there is a pair of circular guide discs 6 mounted on a single shaft 8 carried in a suitable bearing mounted on the frame of the machine (not shown). As is shown in Figure 1, the shafts 4 and 8 are out of alignment. The guide discs 6 are designed to enter the slit in the back of the fish and engage the backbone to support the fish during the belly-slitting operation. The belly-slitting knives 2 and the guide discs 6 are driven by suitable means (not shown) at high peripheral speeds. When the fish leaves the zone of action of the belly knives 2, the fillets are still partly attached to the backbone by a ribbon of flesh between the opposed extremities of the back and belly cuts, and also to the ribs.

The aforementioned belly knives 2 and circular supporting discs 6 are of the general type shown in United States Patent 2,149,021 and, since the specific details of construction thereof form no part of this invention, further description thereof is deemed unnecessary.

The fish is fed through the sphere of action of the belly knives 2 at a high rate of speed and is projected onto a pair of ribbing knives, generally indicated by the reference numeral 10, which sever the flesh attached to the backbone and scrape the flesh from the ribs. A ribbing conveyer, of the type shown in United States Patents 2,149,021 and 2,397,158, and generally indicated by the reference numeral 14, helps to feed the fish across the ribbing knives and maintain it thereon. Since the details of construction of the ribbing conveyer 14 form no part of this invention, they will not be described.

Each of the ribbing knives 10 is formed of two parts, namely, 11 and 12. The knife 11 is seated on a shoulder 22 of the knife holder 24 and is secured thereto by flat screws 26. The knife holders 24 are normally laterally spaced from each other a distance sufficient to permit the knives 11 to enter the slit in the back of a fish and engage the flesh adjacent the backbone and as close as possible thereto, whereby it will be severed as closely as possible to the backbone with a minimum loss of flesh.

Each knife holder 24, at the rear thereof, is provided with a movable hinge element 28 which is pivotally (movably) mounted on a fixed hinge element 30 secured to a knife holder 32 which carries the stationary knife 12, which will hereafter be more fully described.

Means cooperating with each hinged knife holder 24 is provided to equalize the movements thereof when a fish, having a backbone larger than the normal distance between the knives 11, is fed thereto. In the form shown, below each knife holder 24 there is provided a bracket 40 which is secured to a fixed support 42 extending lengthwise of the ribbing knives 12. The supports 42 are oppositely disposed to and spaced from each other. Each support 42 is, at spaced intervals along its length, provided with webbed supports 43 which are securely mounted on a cradle 44 positioned therebeneath and mounted on the main frame of the machine (not shown). Each bracket 40 is provided with a pivot shaft 46 on which a bell-crank lever 48 is pivotally mounted. At the top of its vertical arm, which extends over the respective knife holder 24, each lever 48 is provided with a pad 50 which is adapted to normally engage the exterior surface of the knife holder 24 opposite thereto. Adjacent the free end of its horizontal arm, each lever 48 is provided with an inverted cup 52 in which the top end of a vertical rod 54 is positioned. Each rod 54 passes through a hole 56 in the cradle 44, and the lower end of said rod 54 is seated in a cup 58 provided in one end of a horizontal arm 75 of a lever 60. Each lever 60 is appropriately secured by a pin 61 to a shaft 62 carried by a pair of brackets 64 secured to the cradle 44 by screws 66. The arm 68 of each lever 60 is secured by means of an extension spring 70 to a stationary support 72 mounted on the cradle 44. Each support 72 is provided with a slot 74 whereby it may be adjusted on the cradle 44. A lock nut 76 secures the support 72 in adjusted position. Each bracket 64 is provided with a depending ear 77 which carries an adjustable stop screw 79 which cooperates with the arm 68 to limit its outward movement.

Means cooperating with each of the knife holders 24 are provided to prevent any strain imposed on the movable knife holder 24 by the force of the oncoming fish from being placed on the hinges. Since each of such means is the same, only one will be described in detail.

In the form shown, one end of a bracket 80 is secured to the knife holder 24 adjacent the bottom thereof. The bracket 80 is provided on an extension thereof with an inverted cup 84 in which the top end of a rod 86 is positioned. The lower end of the rod 86 is seated in a cup 90 carried on a threaded stem 92 which is threadedly secured in a hole 94 of the cradle 44. By rotating the stem 92 in the proper direction, the rod 86 may be adjusted as desired. A lock nut 96 locks the stem 92 in adjusted position.

In order to limit the lateral movement or expansion of the knife holder 24, the bracket 80 is provided with a downwardly depending ear 98 which, adjacent its bottom end, carries a stop screw 100 adjustably positioned therein, whereby the movement of the knife holder in one direction is limited. By manipulation of a lock nut 101 on the screw 100 in the desired direction, the movement of the knife holder can be adjusted.

An important feature of this invention resides in providing means adjacent the front end of each of the knives 11 with means which will not break or sever the leading ribs as the fish is projected onto the ribbing knives. This is obtained according to this invention by providing a blunt nose 102. In the form shown, the nose 102 is secured adjacent the bottom edge thereof to the support 42 by means of screws 104. In this embodiment, it is to be noted that the nose 102 is not secured to the knife member 11. Each nose 102 is provided with a recess 106 whereby it overlaps onto the guide disc 6, as shown in Figure 1.

A smooth-surfaced shield 110 is secured by solder to each knife 11 above the top edge of the knife holder 24. As shown in Figure 3, each shield 110 is angularly disposed relative to the knife 11 for reasons which will appear hereafter.

The ribbing knives 12 of the stationary sections at the forward ends thereof are in alignment with the rear ends of the knives 11 and in abutting relationship therewith. Rearwardly of such parallel portions, each knife 12 diverges upwardly. At the extreme extremity is a pair of clipping blades 122 which are circular in form and rotatable and which serve to sever any remaining connection that may exist between the fillets and the ribs of the fish. As shown in Figure 6, each blade 122 rotates in a slot formed by the knife 12 and a guide 123 secured to the knife 12 adjacent thereto. Each of the knives 12 is secured to the rigid holders 32 by screws 130, the rigid holders 32 being secured to the supports 42 by means of flat-ended bolts 132. A shield 136 is secured to the knives 12.

An inclined guard 150 is positioned beneath the shield 110 and the shield 136 and is secured in position by screws 151 cooperating with the members 152 carried or formed integral with the main support 42. Sufficient clearance between the shield 110 and the guard 150 is provided to permit the hinged knife holder 24 to function as herein described.

The invention is not restricted to the precise specific embodiment hereinbefore described. If desired, the blunt noses 102 may be utilized in ribbing knives which do not have a forwardly hinged section. Likewise, the hinged sections need not be provided with the blunt noses at the forward ends thereof though, as previously explained, this is the preferred embodiment. If desired, the blunt noses may be formed integrally with the knives themselves, in which case it is unnecessary to secure the noses to the support 42.

In operation, each of the two levers 60 is, by proper positioning of the respective support 72 on the cradle 44, adjusted so that the equalizer rods 54 will urge the levers 48 in an upward direction whereby each pad 50 thereof will be in contactual relationship with the knife holder 24 opposite thereto. Each of the means which cooperates with each knife holder 24 of the hinged sections to prevent strain from being imposed on the respective hinges is adjusted to properly position the respective rods 86 in the inverted cups 84 and in the cups 90. The adjustment of the strain-preventing means is secured by the proper manipulation of the threaded stems in the desired direction, whereby the cups 90 may be raised or lowered. After the desired position of the cups 90 has been obtained, the stems 92 are locked in position by the nuts 96. The screws 100 in the ears 98 limit the movement of each knife holder 24 in the inward direction. The stop 79 limits the movement in the outward direction.

A fish leaving the zone of action of the belly-slitting knives 2 is projected forwardly at high speed. If desired, a guide (not shown) may be utilized to direct the fish onto the ribbing knives. As the fish leaves the zone of action of the belly-slitting knives 2, the backbone will first engage the blunt noses 102 and thereafter pass onto the ribbing knives 11, from which it will pass onto the ribbing knives 12. The blunt noses 102 do not exert any cutting or severing action but, on the contrary, function as a cushion, with the result that the fish and particularly the leading ribs contacting therewith will not be cut or damaged. Due to the manner of mounting the noses 102, the latter will slightly yield. If the size of the backbone is such as that for which the knives have been adjusted, the knives 11 of the hinged sections will sever the ribbon of meat between the extremities of the belly cuts and back cuts as closely as possible to the backbone with a minimum loss of flesh. Thereafter, the ribbing knives 12 will scrape the flesh from the ribs.

When the backbone of a fish is larger than that for which the knives 11 have been originally set, it will cause the knife holders 24 to yield outwardly at the forward ends thereof so that the knives will function in the manner previously described. The yielding (expanding) movement of the knife holders 24 causes the rods 54 to be depressed, and the springs 70 which are continually urging the rods 54 upwardly cause the knife holders 24 to maintain the knives in close proximity to the edge of the backbone. The outward yielding movement is limited by the stop 79 cooperating with the arm 68. When such a fish has passed over the hinged ribbing knives, the equalizing mechanism returns the knife holders 24 and hence the knives 11 to the original position, the screws 100 limiting the movement in the inward direction.

The force or impact of the oncoming fish is prevented from being transmitted to the hinges, as previously described. It is to be noted that due to the mode of mounting, each rod 86 of the strain-preventing means permits the inward and outward movements of the knife holders.

The instant invention provides simple and efficient fish-ribbing knives which are so constructed as to accommodate various sized fish without severing or breaking the leading ribs. By making the forward section of the ribbing knives hinged, the life of the ribbing knives thereof is materially increased, since they will not have the tendency to cut through the backbone but only adjacent the sides thereof. The equalizing mechanism cooperating with the hinged sections serves to make the ribbing knives in the hinged sections sever the flesh from each side of the backbone at a uniform distance.

Since it is obvious that various changes and modifications may be made in the above description without departing from the nature and spirit thereof, this invention is not restricted thereto except as set forth in the appended claims.

I claim:

1. A fish ribbing apparatus comprising a pair of oppositely disposed ribbing knives, a blunted nose positioned adjacent the top forward extremity of each knife, and means mounting each of said noses adjacent the bottom thereof whereby the upper portions thereof can yield laterally.

2. A fish ribbing apparatus comprising a pair of oppositely disposed stationary ribbing knives, a pair of oppositely disposed knives positioned forwardly of said stationary knives, said stationary and said forwardly disposed knives being disposed with their adjacent ends in abutting relationship to constitute a pair of substantially continuous spaced knives, and means to pivotally mount each of the forwardly positioned knives adjacent the rear thereof.

3. A fish ribbing apparatus comprising a pair of oppositely disposed stationary ribbing knives, a pair of oppositely disposed knives positioned forwardly of said stationary knives, said stationary and said forwardly disposed knives being disposed with their adjacent ends in abutting relationship to constitute a pair of substantially continuous spaced knives, means to pivotally mount each of the forwardly positioned knives adjacent the rear thereof whereby said knives may move toward or away from each other, and means to limit the movement in either direction of each of the said forwardly positioned knives.

4. A fish ribbing apparatus comprising a pair of oppositely disposed stationary ribbing knives, a pair of oppositely disposed knives positioned forwardly of said stationary knives, said stationary and said forwardly disposed knives being disposed with their adjacent ends in abutting relationship to constitute a pair of substantially continuous spaced knives, means to pivotally mount each of the forwardly positioned knives adjacent the rear thereof whereby said knives may move toward or away from each other, and means to equalize the movement of each of said forwardly positioned knives relative to the other.

5. A fish ribbing apparatus comprising a pair of oppositely disposed stationary ribbing knives, a pair of oppositely disposed knives positioned forwardly of said stationary knives, said stationary and said forwardly disposed knives being disposed with their adjacent ends in abutting relationship to constitute a pair of substantially continuous spaced knives, means to pivotally mount each of the forwardly positioned knives adjacent the rear thereof whereby said knives may move toward or away from each other, means continually urging the forwardly positioned knives toward each other, and means limiting the movement of said forwardly positioned knives toward each other.

6. A fish ribbing apparatus comprising a pair of oppositely disposed stationary ribbing knives, a pair of oppositely disposed knives positioned forwardly of said stationary knives, said stationary and said forwardly disposed knives being disposed with their adjacent ends in abutting relationship to constitute a pair of substantially continuous spaced knives, means to pivotally mount each of the forwardly positioned knives adjacent the rear thereof whereby said knives may move toward or away from each other, and means to prevent the strain when fish are fed onto said forwardly positioned knives from being transmitted to their pivots.

7. A fish ribbing apparatus comprising a pair of oppositely disposed stationary knife holders, a ribbing knife rigidly secured to each holder, a pair of oppositely disposed knife holders positioned forwardly of said stationary knife holders, means to pivotally mount each forwardly positioned knife holder onto the stationary knife holder rearwardly thereof whereby said forward knife holders can move toward or away from each other, and a knife rigidly secured to each pivotally mounted knife holder.

8. A fish ribbing apparatus comprising a pair of oppositely disposed stationary knife holders, a ribbing knife rigidly secured to each holder, a pair of oppositely disposed knife holders positioned forwardly of said stationary knife holders, means to pivotally mount each forwardly positioned knife holder onto the stationary knife holder rearwardly thereof whereby said forward knife holders can move toward or away from each other, a knife rigidly secured to each pivotally mounted knife holder, said knives being disposed with their adjacent ends in abutting relationship to constitute a pair of substantially continuous knives, and means cooperating with each of the pivoted knife holders to equalize the movement thereof in either direction with the other.

9. A fish ribbing apparatus comprising a pair of oppositely disposed stationary knife holders, a ribbing knife rigidly secured to each holder, a pair of oppositely disposed knife holders positioned forwardly of said stationary knife holders, means to pivotally mount each forwardly positioned knife holder onto the stationary knife holder rearwardly thereof whereby said forward knife holders can move toward or away from each other, a knife rigidly secured to each pivotally mounted knife holder, said knives being disposed with their adjacent ends in abutting relationship to constitute a pair of substantially continuous knives, and means cooperating with each of the pivoted knife holders to equalize the movement thereof in either direction with the other, said means including means continually urging said pivoted knife holders toward each other.

10. A fish ribbing apparatus comprising a pair of oppositely disposed stationary knife holders, a ribbing knife rigidly secured to each holder, a pair of oppositely disposed knife holders positioned forwardly of said stationary knife holders, means to pivotally mount each forwardly positioned knife holder onto the stationary knife holder rearwardly thereof whereby said forward knife holders can move toward or away from each other, a knife rigidly secured to each pivotally mounted knife holder, said knives being disposed with their adjacent ends in abutting relationship to constitute a pair of substantially continuous knives, means cooperating with each of the pivoted knife holders to equalize the movement thereof in either direction with the other, said means including means continually urging said pivoted knife holders toward each other, and means to limit the movement of each pivoted knife holder.

11. A fish ribbing apparatus as set forth in claim 3 and also having means associated with the forward extremity of each of the forwardly positioned knives to prevent said forwardly positioned knives from breaking or severing the leading ribs of a fish projected thereon.

CHARLES M. SAVRDA.

REFERENCES CITED

The following references are of record in the file of this patent:

UNITED STATES PATENTS

| Number | Name | Date |
| --- | --- | --- |
| 2,149,022 | Hunt | Feb. 28, 1939 |
| 2,179,821 | Hunt | Nov. 14, 1939 |